(12) United States Patent
Chinbe

(10) Patent No.: US 10,856,159 B2
(45) Date of Patent: Dec. 1, 2020

(54) MOBILE TERMINAL TESTING DEVICE AND TEST CASE EXTRACTION METHOD THEREOF

(71) Applicant: ANRITSU CORPORATION, Kanagawa (JP)

(72) Inventor: Ryota Chinbe, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 0 days.

(21) Appl. No.: 16/667,207

(22) Filed: Oct. 29, 2019

(65) Prior Publication Data
US 2020/0205018 A1    Jun. 25, 2020

(30) Foreign Application Priority Data
Dec. 20, 2018  (JP) .................................. 2018-238118

(51) Int. Cl.
| | |
|---|---|
| *H04W 24/00* | (2009.01) |
| *H04W 24/06* | (2009.01) |
| *H04W 8/22* | (2009.01) |
| *H04W 88/08* | (2009.01) |
| *H04W 88/02* | (2009.01) |

(52) U.S. Cl.
CPC ............. *H04W 24/06* (2013.01); *H04W 8/22* (2013.01); *H04W 88/02* (2013.01); *H04W 88/08* (2013.01)

(58) Field of Classification Search
CPC ....... H04W 24/06; H04W 8/22; H04W 88/02; H04W 88/08
USPC .......................................... 455/423; 370/338
See application file for complete search history.

(56) References Cited

U.S. PATENT DOCUMENTS

2015/0264590 A1*  9/2015  Michl .................... H04B 17/11
                                                                     455/67.14
2018/0287906 A1*  10/2018  Clements .............. G06F 11/321

FOREIGN PATENT DOCUMENTS

JP        2017-092827 A      5/2017

* cited by examiner

*Primary Examiner* — Marcos Batista
(74) *Attorney, Agent, or Firm* — Pearne & Gordon LLP

(57) ABSTRACT

Provided is a mobile terminal testing device capable of shortening a time required for extracting a test case of a conformance test and a time required for measuring the conformance test. A mobile terminal testing device includes an operation unit 4 that receives an operation input from a user, a display unit 5 that displays an image, and a control unit 6 that displays on the display unit 5, a list of test cases of a conformance test and a list of identification information of a mobile terminal 10 of which performance information is stored in advance, and collates, for each test case selected from the list of test cases, a requirement of the test case with the performance information of the mobile terminal 10 selected from the list of identification information of the mobile terminal to extract a test case to be measured.

4 Claims, 3 Drawing Sheets

| Test case | Release Version | Category | PowerClass | FGI |
|---|---|---|---|---|
| 6.2.2 UE Maximum Output Power | release 8 and forward | N/A | 3 | N/A |
| 6.2.2_1 Maximum Output Power for HPUE | release 10 and forward | N/A | 1 or 2 | N/A |
| 6.2.2EA UE Maximum Output Power for UE category M1 | release 13 and forward | M1 | 3 or 5 | N/A |
| 8.2.1.2.1 FDD PDSCH Transmit Diversity 2x2 | release 8 and forward | 1~8 | N/A | N/A |
| 8.2.1.2.1_1 FDD PDSCH Transmit Diversity 2x2 (Release 9 and forward) | release 9 and forward | 1 | N/A | N/A |
| 8.2.1.2.2 FDD PDSCH Transmit Diversity 4x2 | release 8 and forward | 1~8 | N/A | N/A |
| 8.2.1.2.2_1 FDD PDSCH Transmit Diversity 4x2 (Release 9 and forward) | release 9 and forward | 1~8 | N/A | N/A |
| 8.2.1.2.3_C.1 FDD PDSCH Transmit Diversity 2x2 for eICIC (non-MBSFN ABS) | release 10 and forward | 2~8 | N/A | FGI bit 115 |

FIG.2

MOBILE TERMINAL TESTING DEVICE AND TEST CASE EXTRACTION METHOD THEREOF

TECHNICAL FIELD

The present invention relates to a mobile terminal testing device which tests a mobile terminal.

BACKGROUND ART

In a case of developing a mobile communication terminal such as a mobile phone or a data communication terminal, it is necessary to test whether or not the developed mobile communication terminal can normally perform communication. Therefore, a testing device which operates as a pseudo base station simulating a function of an actual base station is connected to a mobile communication terminal to be tested, communication is performed between the testing device and the mobile communication terminal, and a test of checking the contents of the communication is performed.

Such a test includes a conformance test for checking whether or not the mobile communication terminal conforms to the 3rd Generation Partnership Project (3GPP) standard.

Each checking item in the conformance test is called a test case. Each test case specifies information (performance information) on the performance of the mobile communication terminal to be measured, called Test Applicability, which is requirements for performing the test case. Specifically, the information includes UE Release Version, UE Category, UE Power Class, and Feature Group Indicator (FGI).

The performance information (also referred to as UE Capability) of the mobile communication terminal is transmitted from the mobile communication terminal to the base station by a signaling message.

Patent Document 1 describes a technique in which a user equipment efficiently notifies a base station of its capability regarding carrier aggregation.

RELATED ART DOCUMENT

Patent Document

[Patent Document 1] JP-A-2017-92827

DISCLOSURE OF THE INVENTION

Problem that the Invention is to Solve

In performing a conformance test, in order to extract a test case to be measured by collating Test Applicability of a test case with performance information of a mobile communication terminal to be measured, deep understanding of the Test Applicability of the test case and the performance information of the mobile communication terminal is needed, and a great deal of labor is required.

In addition, in a method of automatically discriminating a test case to be measured by obtaining performance information of a mobile communication terminal to be measured by using a signaling message when each test case is measured, it is necessary to acquire the performance information of the mobile communication terminal every time a test case is measured, which increases the measurement time.

Accordingly, an object of the present invention is to provide a mobile terminal testing device capable of shortening a time required for extracting a test case of a conformance test and a time required for measuring the conformance test.

Means for Solving the Problem

A mobile terminal testing device according to the present invention is a mobile terminal testing device which performs a conformance test of a mobile terminal, and includes a control unit that displays on a display unit, a list of test cases of the conformance test and a list of identification information of the mobile terminal of which UE Capability information is stored in advance, and collates, for each test case selected from the list of test cases, Test Applicability information of the test case with the UE Capability information of the mobile terminal selected from the list of identification information of the mobile terminal to extract a test case in which the UE Capability information satisfies the Test Applicability information, as a test case to be measured.

With this configuration, the list of test cases of the conformance test and the list of identification information of the mobile terminal of which UE Capability information is stored are displayed, and for each test case selected from the list of test cases, Test Applicability information of the test case is collated with the UE Capability information of the mobile terminal selected from the list of identification information of the mobile terminal to extract a test case to be measured. Therefore, it is possible to shorten a time required for extracting a test case of a conformance test and a time required for measuring the conformance test.

Further, in the mobile terminal testing device of the present invention, the control unit may store the UE Capability information acquired by transmitting and receiving a signaling message to and from the mobile terminal in association with identification information for identifying the mobile terminal.

With this configuration, UE Capability information acquired by transmitting and receiving signaling messages to and from the mobile terminal is stored and added to the mobile terminals displayed as a list. Therefore, it is possible to shorten a time required for extracting a test case of a conformance test and a time required for measuring the conformance test.

Further, a test case extraction method of a mobile terminal testing device according to the present invention is a test case extraction method of a mobile terminal testing device which performs a conformance test of a mobile terminal, and includes a step of displaying on a display unit, a list of test cases of the conformance test and a list of identification information of the mobile terminal of which UE Capability information is stored in advance, and a step of collating, for each test case selected from the list of test cases, Test Applicability information of the test case with the UE Capability information of the mobile terminal to extract a test case in which the UE Capability information satisfies the Test Applicability information, as a test case to be measured.

With this configuration, the list of test cases of the conformance test and the list of identification information of the mobile terminal of which UE Capability information is stored are displayed on a display unit, and for each test case selected from the list of test cases, Test Applicability information of the test case is collated with the UE Capability information of the mobile terminal selected from the list of identification information of the mobile terminal to extract a test case to be measured. Therefore, it is possible to shorten a time required for extracting a test case of a conformance test and a time required for measuring the conformance test.

In addition, the test case extraction method according to the present invention further includes a step of storing the UE Capability information acquired by transmitting and receiving a signaling message to and from the mobile terminal in association with identification information for identifying the mobile terminal.

With this configuration, the UE Capability information acquired by transmitting and receiving a signaling message to and from the mobile terminal is stored, and added to the list of the mobile terminal. Therefore, it is possible to shorten a time required for extracting a test case of a conformance test and a time required for measuring the conformance test.

Advantage of the Invention

According to the present invention, it is possible to provide a mobile terminal testing device capable of shortening a time required for extracting a test case of a conformance test and a time required for measuring the conformance test.

BRIEF DESCRIPTION OF THE DRAWINGS

FIG. 2 is a diagram showing an example of a test case in a conformance test of the mobile terminal testing device according to the embodiment of the present invention.

BEST MODE FOR CARRYING OUT THE INVENTION

Hereinafter, a mobile terminal testing device according to an embodiment of the present invention will be described in detail with reference to the drawings.

Figure 1:
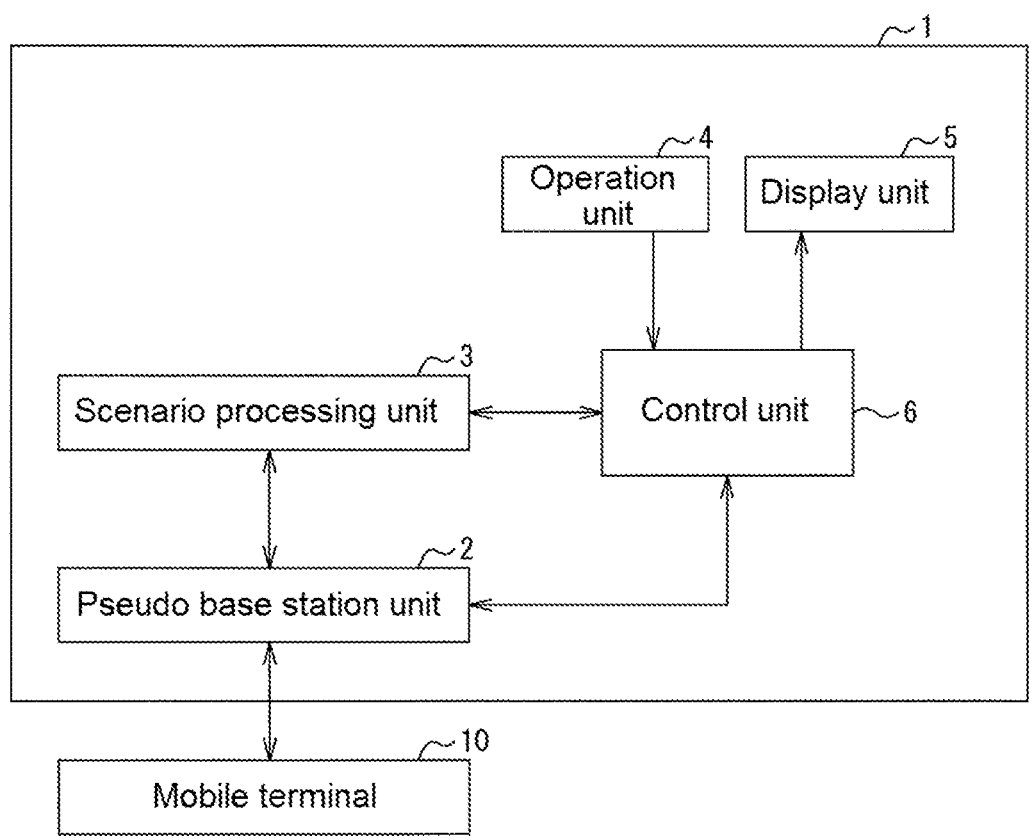
FIG. 1 is a block diagram of a main part of a mobile terminal testing device according to an embodiment of the present invention.

In FIG. 1, a mobile terminal testing device 1 according to an embodiment of the present invention as a pseudo base station transmits and receives radio frequency (RF) signals to and from a mobile terminal 10 by wire through a coaxial cable or the like. Further, the mobile terminal testing device 1 may transmit and receive RF signals to and from the mobile terminal 10 through an antenna by radio.

The mobile terminal testing device 1 includes a pseudo base station unit 2, a scenario processing unit 3, an operation unit 4, a display unit 5, and a control unit 6.

The pseudo base station unit 2 transmits and receives RF signals to and from the mobile terminal 10 under the control of the scenario processing unit 3. The pseudo base station unit 2 outputs the state of communication with the mobile terminal 10 to the control unit 6.

The scenario processing unit 3 reads out a stored scenario according to an instruction from the control unit 6, causes the pseudo base station unit 2 to transmit broadcast information based on the scenario, and execute a communication sequence with the mobile terminal 10.

The operation unit 4 is input devices such as a keyboard, a mouse, and a touch panel, and outputs operation-input information necessary for generating a scenario to the control unit 6. The display unit 5 is an image display device such as a liquid crystal display, and displays an image for inputting information necessary for generating a scenario and an image showing a state under test.

The control unit 6 displays a test scenario creation screen on the display unit 5 according to an instruction input on the operation unit 4 to input information necessary for creating a test scenario, or creates the test scenario based on the information input by the operation unit 4 on the test scenario creation screen. Further, the control unit 6 transmits an instruction to the scenario processing unit 3 according to the instruction input to the operation unit 4 to execute a test based on the test scenario stored in the storage device, or displays the state under test on the display unit 5, based on information on the state of each layer and the state of communication with the mobile terminal 10, which are transmitted from the scenario processing unit 3.

Here, the mobile terminal testing device 1 is constituted of a computer device (not shown) provided with a communication module for communicating with the mobile terminal 10. The computer device includes a central processing unit (CPU), a read only memory (ROM), a random access memory (RAM), a storage device such as a hard disk device, an input/output port, and a touch panel, which are not shown.

A program for making a computer device function as a mobile terminal testing device 1 is stored in a ROM and a hard disk device of the computer device. That is, the CPU executes the program stored in the ROM with the RAM as a work area, and the computer device functions as the mobile terminal testing device 1.

Thus, in the present embodiment, the scenario processing unit 3 and the control unit 6 are the CPU, and the pseudo base station unit 2 is the communication module.

In the mobile terminal testing device 1 having such a configuration, in the storage device, the information on the test cases of the conformance test is stored in association with each Test Applicability and the test case number as identification information.

The control unit 6 stores the performance information (also referred to as UE Capability) of the mobile terminal 10 acquired by the pseudo base station unit 2 by transmitting and receiving a signaling message to and from the mobile terminal 10 in association with an identifier for identifying the mobile terminal 10 in the storage device. Note that the performance information of the mobile terminal 10 can be input by operating the operation unit 4 and stored in the storage device in association with the input identifier.

When the execution of the conformance test is selected by operating the operation unit 4, the control unit 6 reads the identifier of the mobile terminal 10 of which the performance information is stored in the storage device and the list of test cases, and displays the list of test cases and the list of identifiers of the mobile terminal 10 on the display unit 5.

The control unit 6 displays a message on the display unit 5 such that a test case to be executed and an identifier of the mobile terminal 10 to be tested are selected from the displayed list of test cases and list of identifiers of the mobile terminal 10.

When the test case to be executed and the identifier of the mobile terminal 10 to be tested are selected, the control unit 6 collates the Test Applicability of the test case with the performance information of the selected mobile terminal for each selected test case, and sets a test case for which the Test Applicability matches performance information, as a test case to be measured.

As shown in FIG. 2, the test cases in the conformance test include, for example, information such as UE Release Version, UE Category, UE Power Class, and FGI as Test Applicability for each test case. The fact that the Test Applicability matches the performance information means that the performance information of the mobile terminal 10 to be tested satisfies the performance requirements of the mobile terminal 10 defined as Test Applicability.

For example, in the test cases shown in FIG. 2, when testing the mobile terminal 10 of Release 9, Category 3, Power Class 3, and FGI: N/A, test cases of 6.2.2, 8.2.1.2.1, 8.2.1.2.2, and 8.2.1.2.2_1 are test cases to be measured.

When collating Test Applicability with performance information for all the selected test cases, the control unit 6 displays a list of test cases determined to be measured on the display unit 5 as test cases scheduled to be measured.

When execution of measurement is selected by operating the operation unit 4 in a state where the test cases scheduled to be measured are displayed, the control unit 6 sequentially measures the test cases in the list of test cases scheduled to be measured.

As described above, in the present embodiment, since the test case that needs to be measured is automatically extracted simply by selecting the test case that is desired to be executed and the identifier of the mobile terminal 10 that is desired to be tested, there is no need to manually extract test cases matching the performance information, and the time required for extracting test cases of conformance test can be shortened.

Further, since the performance information of the mobile terminal 10 is stored in a storage device in association with the identifier and used as performance information for test case extraction, there is no need to obtain the performance information of the mobile terminal 10 to be measured by using the signaling message when measuring each test case, and the time required for conformance test measurement can be shortened.

Further, since the pseudo base station unit 2 stores the performance information of the mobile terminal 10 acquired by transmitting and receiving a signaling message to and from the mobile terminal 10 in association with the identifier in the storage device and uses it as performance information for test case extraction, there is no need to check and set the performance information of the mobile terminal 10, and the test can be performed efficiently.

Figure 3:
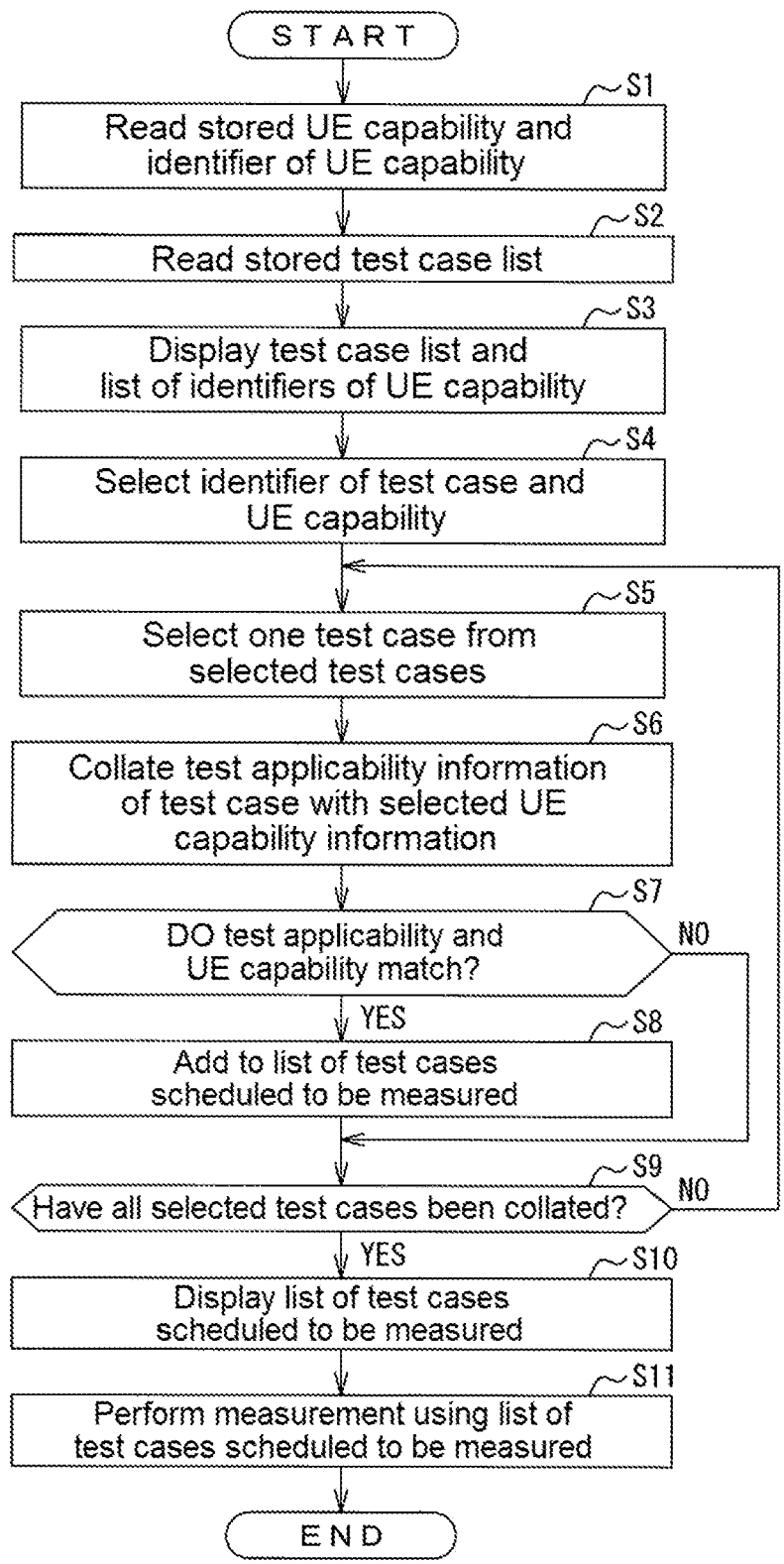
FIG. 3 is a flowchart explaining a procedure of a test case extraction process of the mobile terminal testing device according to the embodiment of the present invention.

The test case extraction process performed by the mobile terminal testing device 1 according to the present embodiment configured as described above will be described with reference to FIG. 3. Note that the test case extraction process described below is executed when the execution of the conformance test is selected by operating the operation unit 4.

In step S1, the control unit 6 reads the UE Capability stored in the storage device and the identifier of the mobile terminal 10.

In step S2, the control unit 6 reads a test case list stored in the storage device.

In step S3, the control unit 6 displays a test case list and a list of identifiers of the mobile terminal 10 of which UE Capability is stored, on the display unit 5.

In step S4, the control unit 6 displays a message on the display unit 5 and selects a test case to be executed and an identifier of the mobile terminal 10 to be tested from a list of test cases and a list of identifiers of the mobile terminal 10.

In step S5, the control unit 6 selects one test case from the selected test cases.

In step S6, the control unit 6 collates the Test Applicability information of the test case with the UE Capability information of the selected mobile terminal 10.

In step S7, the control unit 6 determines whether or not Test Applicability and UE Capability match. When it is determined that the Test Applicability and the UE Capability match, the control unit 6 adds this test case to the list of test cases scheduled to be measured, in step S8.

When it is determined in step S7 that Test Applicability and UE Capability do not match, or after the test case is added to the list of test cases scheduled to be measured in step S8, the control unit 6 determines in step S9 whether or not Test Applicability and UE Capability have been collated for all selected test cases. When it is determined that collation is not performed for all the selected test cases, the process returns to step S5 and the process is repeated.

When it is determined that collation is performed for all the selected test cases, the control unit 6 displays the list of extracted test cases scheduled to be measured on the display unit 5 in step S10.

In step S11, the control unit 6 performs measurement using the list of test cases scheduled to be measured.

Although embodiments of the present invention have been disclosed, it will be apparent to those skilled in the art that modifications may be made without departing from the scope of the invention. All such modifications and equivalents are intended to be included in the following claims.

DESCRIPTION OF REFERENCE NUMERALS AND SIGNS

1 mobile terminal testing device
2 pseudo base station unit
4 operation unit
5 display unit
6 control unit

What is claimed is:

1. A mobile terminal testing device which performs a conformance test of a mobile terminal, comprising:
   a control unit that:
   displays on a display unit a list of test cases of the conformance test and a list of identification information of the mobile terminal of which identification information and UE Capability information are stored in advance,
   selects at least one test case from the list of test cases and one identification information of the mobile terminal from the list of identification information of the mobile terminal,
   collates, for each test case selected from the list of test cases, Test Applicability information of the test case with the UE Capability information of the mobile terminal selected from the list of identification information of the mobile terminal, and
   automatically extracts a test case in which the UE Capability information satisfies the Test Applicability information, as a test case to be measured.

2. The mobile terminal testing device according to claim 1,
   wherein the control unit stores the UE Capability information acquired by transmitting and receiving a signaling message to and from the mobile terminal in association with identification information for identifying the mobile terminal.

3. A test case extraction method of a mobile terminal testing device which performs a conformance test of a mobile terminal, the method comprising:
   a step of displaying on a display unit, a list of test cases of the conformance test and a list of identification information of the mobile terminal of which identification information and UE Capability information are stored in advance;

a step of selecting at least one test case from the list of test cases and one identification information of the mobile terminal from the list of identification information of the mobile terminal;

a step of collating, for each test case selected from the list of test cases, Test Applicability information of the test case with the UE Capability information of the mobile terminal selected from the list of identification information of the mobile terminal; and a step of automatically extracting a test case in which the UE Capability information satisfies the Test Applicability information, as a test case to be measured.

4. The test case extraction method according to claim 3, further comprising:

a step of storing the UE Capability information acquired by transmitting and receiving a signaling message to and from the mobile terminal in association with identification information for identifying the mobile terminal.

* * * * *